United States Patent [19]

Tsuyoshi et al.

[11] Patent Number: 5,218,599
[45] Date of Patent: Jun. 8, 1993

[54] METHOD OF RECORDING AND REPRODUCTION OF INFORMATION USING A RECORDING MEDIUM AVAILABLE FOR INFORMATION OVERLAP RECORDING, A RECORDING MEDIUM AND A RECORDING AND REPRODUCING APPARATUS USING THE METHOD

[75] Inventors: Toshiaki Tsuyoshi, Kawasaki; Yoshito Tsunoda, Tokyo, both of Japan; Hiromichi Fujisawa, Dublin, Ireland

[73] Assignee: Hitachi, Ltd., Tokyo, Japan

[21] Appl. No.: 412,474

[22] Filed: Sep. 26, 1989

[30] Foreign Application Priority Data

Sep. 28, 1988 [JP] Japan ................................ 63-240976

[51] Int. Cl.⁵ .............................................. G11B 7/20
[52] U.S. Cl. ........................... 369/275.1; 369/275.4; 369/13; 369/286; 360/2
[58] Field of Search ............... 369/275.1, 275.2, 275.3, 369/275.4, 13, 14, 15283, 284, 286, 288; 365/122; 360/114, 59, 2

[56] References Cited

U.S. PATENT DOCUMENTS

| | | | |
|---|---|---|---|
| 4,509,161 | 4/1985 | Van de Leest et al. | 369/275.3 |
| 4,564,929 | 1/1986 | Yonezawa et al. | 369/275.4 |
| 4,703,469 | 10/1987 | Pettigrew et al. | 369/275.3 |
| 4,733,385 | 3/1988 | Henmi et al. | 364/13 |
| 4,736,352 | 4/1988 | Satoh et al. | 364/275.3 |
| 4,750,152 | 6/1988 | Yonekubo et al. | 369/13 |
| 4,769,802 | 9/1988 | Tatsduguchi | 369/275.3 |
| 4,817,075 | 3/1989 | Kikuchi et al. | 369/14 |
| 4,868,373 | 9/1989 | Opheij et al. | 369/14 |
| 4,879,703 | 10/1989 | Kaku et al. | 369/58 |
| 4,905,215 | 2/1990 | Hattori et al. | 369/13 |
| 4,940,618 | 7/1990 | Hamada et al. | 369/275.1 |
| 4,961,183 | 6/1990 | Tinet | 369/275.4 |

FOREIGN PATENT DOCUMENTS 0291227  11/1988  Japan ................................ 369/275.3

Primary Examiner—Eugene R. LaRoche
Assistant Examiner—Tan Nguyen
Attorney, Agent, or Firm—Antonelli, Terry, Stout & Kraus

[57] ABSTRACT

A recording medium is provided with a recording film having opto-magnetic characteristics formed on the substrate, with first information being recorded in advance in the form of pit strings of a phase structure. Second information is recorded over the first information through the application of a magnetic field with polarities corresponding to the second information in the presence of the irradiation of a high-power radiation beam, without damaging the record of the first information. The first and second information are produced independently and simultaneously with a single spot in the same area by use of different signal reproduction mechanisms for the first information and second information. The first information (ROM information) is reproduced as the variation in the amount (intensity) of the reflected light from the opto-magnetic recording film, and the second information (RAM information) is reproduced by detecting the rotational angle of the reflected light, based on the Kerr effect, from the opto-magnetic film concurrently with the reproduction of the first information using a single spot.

18 Claims, 6 Drawing Sheets

C: OVERLAPPED ROM/RAM AREA

C: OVERLAPPED ROM/RAM AREA

A: ROM AREA
B: RAM AREA

FIG. 8A
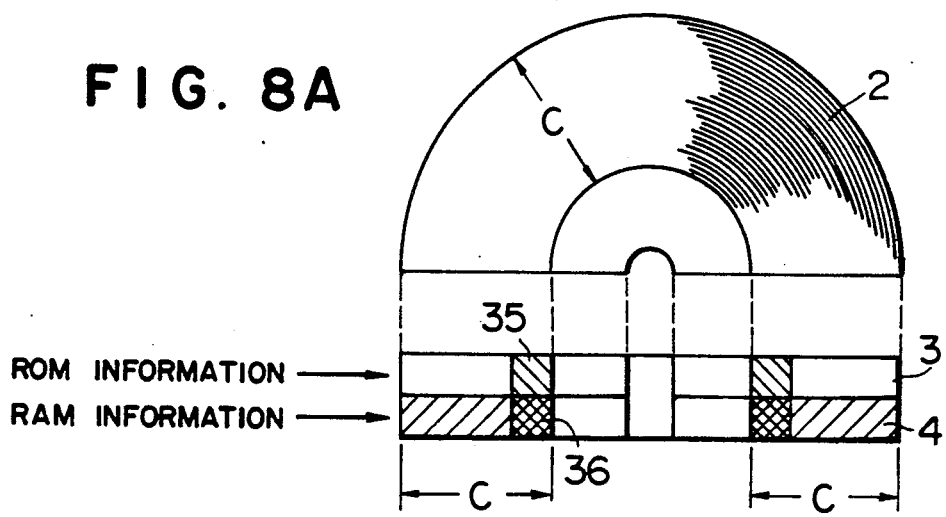
ROM INFORMATION
RAM INFORMATION
FIG. 8B
| ROM INDEX | | RAM INDEX | | |
|---|---|---|---|---|
| TITLE OF INFORMATION | ADDRESS | TITLE OF INFORMATION | ADDRESS | CORRESPONDING ROM INFORMATION |
| 1 ABCD | 0100 | 1 cdaf | 0110 | 004F |
| 2 BAEG | 013F | 2 efgh | 0352 | 079E |
| 3 CDKA | 0A7E | 3 kanp | 1371 | 013F |
FIG. 9
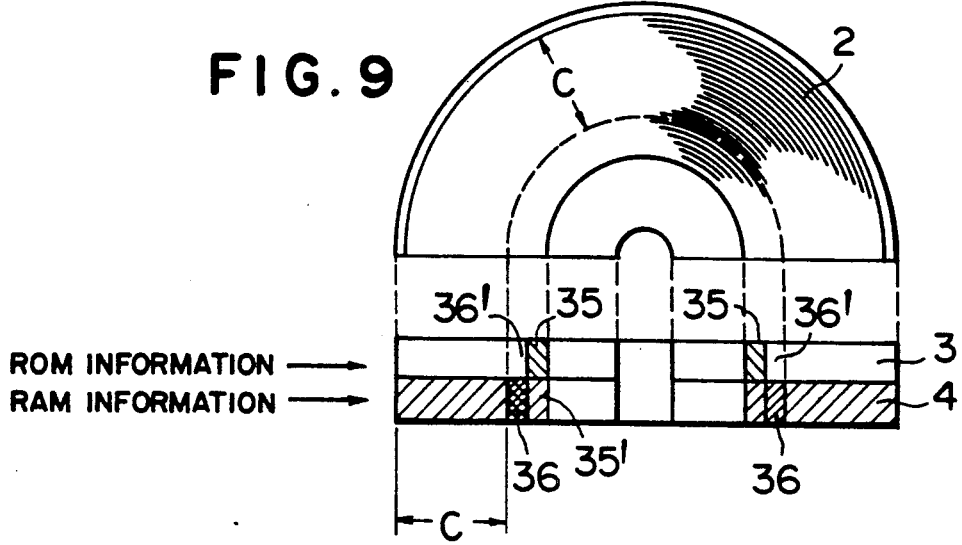
ROM INFORMATION
RAM INFORMATION

METHOD OF RECORDING AND REPRODUCTION OF INFORMATION USING A RECORDING MEDIUM AVAILABLE FOR INFORMATION OVERLAP RECORDING, A RECORDING MEDIUM AND A RECORDING AND REPRODUCING APPARATUS USING THE METHOD

BACKGROUND OF THE INVENTION

The present invention relates to an optical information recording apparatus, such as an optical disk file unit or optical card file unit, and particularly to a method of recording and reproduction of information using a recording medium available for information overlap recording, and to a recording medium and a recording and reproducing apparatus using the method.

Information systems using optical disks include a reproduction-only type such as the compact disk (CD), video disk, CD-ROM, CDV, etc., and a recording-reproduction type which allows a user to record information. Conventionally, optical disks have been used by a user mostly in two ways. One way of use is in a sense of ROM (read-only memory) in which reproduction-only optical disks such as the CD, video disk and CD-ROM are used by a user for reproducing information which is supplied through mass-produced and relatively inexpensive replica-disks. The other way of use is in a sense of RAM (random access memory) in which a user buys a blank optical disk for creating an optical disk file, records a relatively large quantity of arbitrary information on the disk, adds or rewrites information, and retrieves the information from the disk.

There is known an optical disk which stores the mixture of ROM information and RAM information, in which, as shown in FIG. 2, an optical disk 1 is partitioned in the radial direction into, for example, an area A as a ROM area where ROM information is recorded in advance in the form of pits (phase structure) and an area B as a RAM area which can be recorded arbitrarily by the user. Refer to a Japanese publication NIKKEI ELECTRONICS, No. 443, pp. 88-89, published on Mar. 21, 1988, or JP-A-61-280048, for example.

The optical disk shown in FIG. 2 can store ROM information which is supplied at the purchase and RAM information which is recorded by the user on the same recording medium, and reproduction of ROM information and recording and reproduction of RAM information can take place on a single disk drive unit. However, user-recorded information in the RAM area is often related to some information in the ROM area, and therefore, in operation the optical head needs to move back and forth between the two areas frequently, expending a considerable time for the movement. If it is intended to retrieve information in the ROM area and RAM area concurrently, two optical heads are needed for making simultaneous access to the distant areas, with both optical heads being operated in synchronism, resulting in a complex mechanism.

SUMMARY OF THE INVENTION

An object of the present invention is to provide an information recording medium which can store first information (ROM information) which is recorded at manufacturing and second information (RAM information) which is recorded arbitrarily by the user in the same spatial area.

Another object of the present invention is provide an information recording medium which can store information in a double density at maximum and can reproduce first and second informations concurrently with one spot.

A further object of the present invention is to provide a method of recording and reproduction capable of overlap(multiplex)-recording, on the above-mentioned recording medium, second information arbitrarily over first information without damaging the record of the first information, and capable of reproducing the first and second informations concurrently with one spot without incurring the interference.

A further object of the present invention is to provide a recording and reproduction apparatus capable of overlap-recording, on the above-mentioned recording medium, second information over first information without damaging the record of the first information, and reproducing the first and second informations concurrently with one spot.

According to one aspect of the present invention, an information recording medium is in the structure which comprises a transparent substrate on which, at least on one side thereof, first information is prerecorded as pit strings or trains of a phase structure (i.e., of an embossment structure), and a recording film having opto-magnetic characteristics formed on the above-mentioned side of the substrate for recording second information through the application of a magnetic field with polarities corresponding to the second information in the presence of the irradiation of a high-power radiation beam, so that at least part of the first information and at least part of the second information are recorded in an overlap relation in the same spatial area.

According to another aspect of the present invention, an information recording and reproduction method makes use of an information recording medium which comprises a transparent substrate on which, at least on one side thereof, first information is pre-recorded as pit strings of a phase structure, and a recording film having opto-magnetic characteristics formed on the above-mentioned side of the substrate for recording second information through the application of a magnetic field with polarities corresponding to the second information in the presence of the irradiation of a high-power radiation beam, and in the operation in which at least part of the second information is overlap-recorded over at least part of the first information through the application of a magnetic field with polarities corresponding to the second information in the presence of the irradiation of the high-power radiation beam, and the first information is reproduced from the variation of intensity of a reflected light resulting from the irradiation of a low-power radiation beam on the area where the first and second informations are recorded and the second information is reproduced from the rotation of polarization plane of the reflected light.

According to another aspect of the present invention, a recording and reproducing apparatus comprises an information recording medium having a transparent substrate on which, at least on one side thereof, first information is pre-recorded as pit strings of a phase structure, and a recording film having opto-magnetic characteristics formed on the above-mentioned side of the substrate for recording second information through the application of a magnetic field with polarities corresponding to the second information in the presence of the irradiation of a high-power radiation beam; irradiation means which irradiates the high-power radiation beam to the information recording medium in recording the second information or irradiates a low-power radiation beam to the medium during the operation other than the recording of the second information; magnetic field application means which applies, during the recording of the second information, a magnetic field with polarities corresponding to the second information; first reproduction means which reproduces the first information from the variation of intensity of a reflected light from the information recording medium; and second reproduction means which reproduces the second information from the rotation of polarization plane of the reflected light from the information recording medium, so that at least part of the second information is overlap-recorded over at least part of the first information through the application, by the magnetic field application means, of a magnetic field with polarities corresponding to the second information in the presence of the irradiation of the high-intensity radiation beam by the radiation means.

In one embodiment of the present invention, the recording medium is provided with a recording film with opto-magnetic characteristics formed on the substrate on which first information is recorded in advance as pit strings of a phase structure, and second information is overlap-recorded over the first information through the application of a magnetic field with polarities corresponding to the second information in the presence of the irradiation of a high-power radiation beam without damaging the record of the first information. The first and second informations are reproduced independently and simultaneously with a single spot in the same area by means of different signal reproduction mechamisms for the first information and second information.

Specifically, the recording medium is provided with a recording film, which also serves as a reflective film, with opto-magnetic characteristics formed on a transparent substrate on which first information (ROM information) is recorded in advance in the form of pits with a depth of a quarter wavelength for example. User's second information (RAM information) is recorded on the recording film in the area, where the record of first information resides, in the magnetic field modulation mode in which a magnetic field with polarities corresponding to the second information is applied to the recording film without damaging the record of the first information in the presence of a high-power radiation beam to the recording film through the substrate. The first information (ROM information) is reproduced as a variation of intensity of a reflected light from the opto-magnetic recording film, and the second information (RAM information) is reproduced simultaneously on one spot by detecting the rotation of polarization plane, based on the Kerr effect, of the reflected light from the opto-magnetic recording film.

In another embodiment of the present invention, the signal of the first information (ROM information) and the signal of the second information (RAM information) are reproduced by different reproduction mechanisms, which are basically independent of each other, whereby it becomes possible to overlap-record the first information (ROM information) and second information (RAM information) in the same area, and to reproduce both informations concurrently with one spot.

In another embodiment of the present invention, the user's second information (RAM information) is recorded on the basis of opto-magnetic recording and it can be erased any number of times without damaging the supplied record of the first information (ROM information) during the normal use, whereby the user can record and erase the second information arbitrarily on the opto-magnetic recording film without destructing the first information.

BRIEF DESCRIPTION OF THE DRAWINGS

FIGS. 8A, 8B and 9 are diagrams showing another embodiment of the inventive information recording medium and explaining the layout of the index areas.

DESCRIPTION OF THE PREFERRED EMBODIMENTS

The present invention is, in one embodiment, intended to integrate the ROM-oriented usage and RAM-oriented usage of the information recording medium. It means that primary information recorded at manufacturing on a mass-produced recording medium such as a compact disk (CD) is modified (rewriting, extraction, etc.) for the user-intended purpose, and thereafter user's secondary information is recorded by the user on the same recording medium (e.g., disk) so as to complete a personal information bank. More specifically, for example, the manufacturer supplies a dictionary such as an English-Japanese dictionary as the first information (ROM information) recorded on an information recording medium (e.g., disk), and the user extracts by playback only necessary vocabularies and creates a personal vocabulary collection as the second information on the same information recording medium, so that it is used as a dictionary incorporating a list of vocabularies.

An embodiment of this invention will be described with reference to FIG. 1. In this embodiment, the first information (ROM information) is pre-recorded as pits of a phase structure with a depth of a quarter wavelength on one side of the disk substrate, and the user's second information (RAM information) is recorded by the user on the opto-magnetic recording film which is deposited by evaporation on the disk substrate.

Figure 1A:
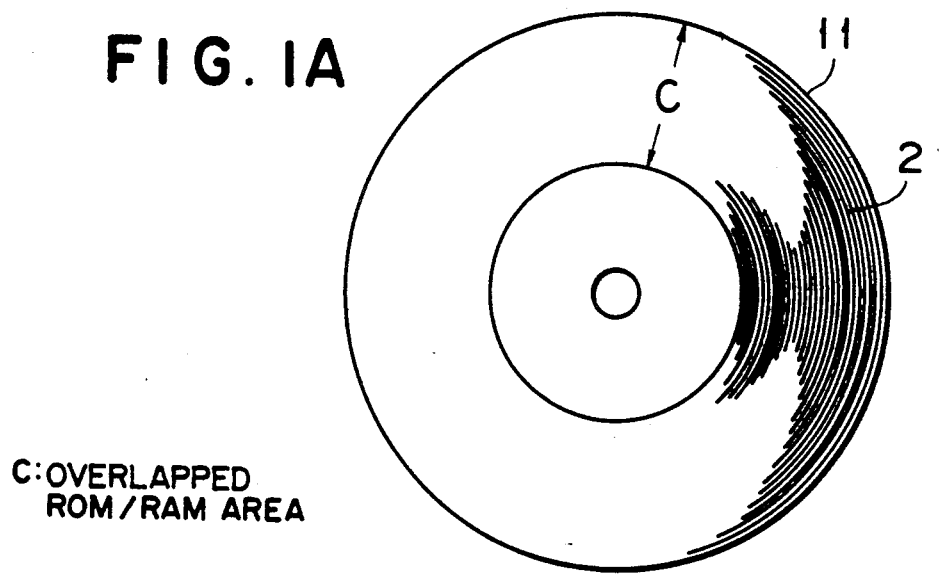
FIG. 1A is a diagram explaining in brief the shape of the opto-magnetic disk which is an embodiment of the inventive information recording medium.

FIG. 1A is an overall view of the disk used in this embodiment, in which the entire information area indicated by C is formed as an overlap recording area for recording the first information (ROM information) and second information (RAM information). The ROM information is recorded in advance as strings (trains) of pits of a phase structure to form concentric or spiral information tracks 2 with a spacing of about 1.6 μm between adjacent tracks for example.

Figure 1B:
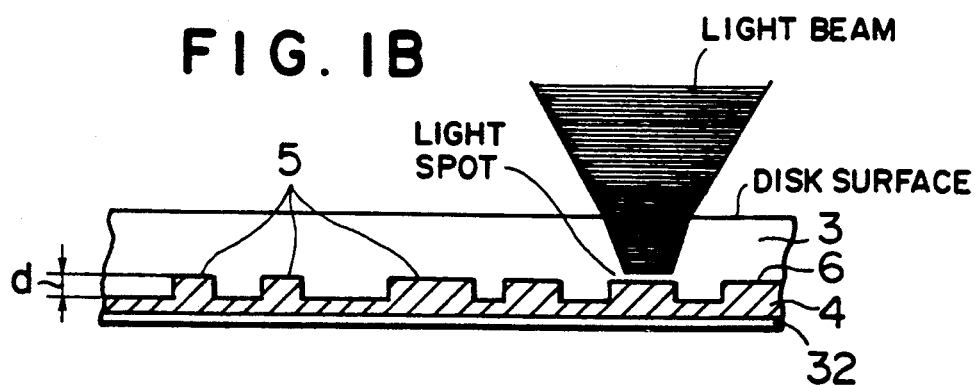
FIG. 1B is a diagram explaining the cross-sectional structure of the disk shown in FIG. 1A.
Figure 2:
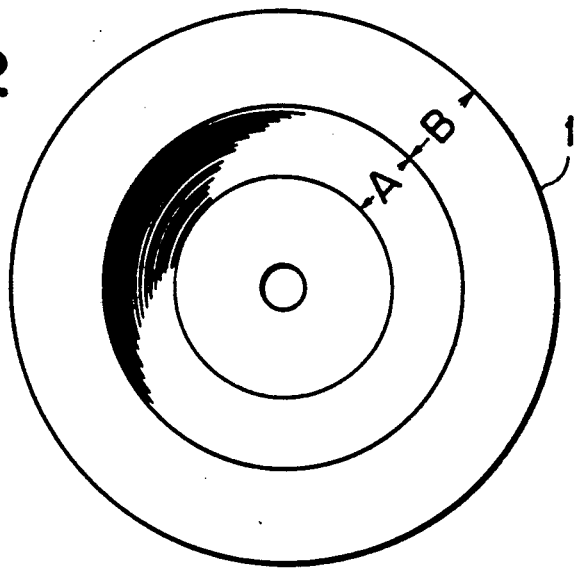
FIG. 2 is a diagram explaining the conventional disk having ROM and RAM areas.

FIG. 1B shows the cross-sectional structure of the disk 1 along the track. The disk is formed at least of a transparent substrate 3 made of plastics or glass and an opto-magnetic recording film 4 having the Kerr effect. The ROM information is recorded at manufacturing as strings of pits 5 by being modulated in terms of the pit length, pit interval or the like on one side of the substrate 3. These pits are formed by the injection method, photo polymerization (2P) method, glass etching method, or the like.

A light beam for recording and reproduction goes through the transparent substrate 3 and forms a small light spot with a diameter of about 1.6 μm on the interface 6 between the substrate 3 and recording film 4. The incident light is reflected by the recording film 4, and the incident light and reflected light interfere with each other, causing the amount of reflected light to vary due to different lengths of 2-way light path 2d attributable to the presence or absence of a pit. From the variation in the amount of reflected light, the presence or absence of pits, i.e., the first information (ROM information) can be detected. For the best condition of reproduction, the depth d of a pit is preferablely equal to a quarter wavelength of the reproducing light source, and when the reproducing light has a wavelength of 800 nm and the disk substrate 3 has a refractivity of 1.5, the best pit depth is about 130 nm.

The opto-magnetic recording film 4 is formed of elements including Fe, Tb, Co, etc., and if the temperature of the film rises above a certain temperature (Curie temperature ranging 100°–200° C. due to the light spot created by the incident light, the internal magnetic field (coercive force) subsides. At this time, when the film is cooled, with an external magnetic field being applied perpendicular to the film surface, the direction of the magnetic field is held on the film surface. Accordingly, by varying the polarity (upward or downward) of the external magnetic field depending on the second information to be recorded, while heating the film surface with the beam spot, information can be recorded in the opto-magnetic recording film 4. This is the principle of the technique called magnetic field modulation opto-magnetic recording. The opto-magnetic signal recorded in this manner is reproduced by utilization of the Kerr effect possessed by the opto-magnetic recording film. The Kerr effect is a phenomenon in that when a linearly polarized light with a low intensity to the extent of not incurring a temperature rise of the recording film is irradiated to the opto-magnetic recording film which holds the magnetic field in correspondence to the record of information, the polarization plane of the reflected light develops a little rotation. If the magnetic field held by the recording film 4 is opposite in direction, the direction of rotation of the polarization plane is also opposite. Therefore, the opto-magnetic record of information (second information) in the opto-magnetic recording film 4 can be reproduced by detecting the rotation of polarized plane of the reflected light. The detection of the rotation of polarized plane is carried out by using an optical system which will be described later. These are the principle of recording and reproduction for the second information (RAM information) dealt with by the user.

As described above, the first information (ROM information) is carried by the reflected light in terms of the variation of intensity, while the second information (RAM information) is carried by the reflected light in terms of the rotation of polarized plane, and the two kinds of information are basically independent of each other. The opto-magnetic record of the second information (RAM information) can be erased and rewritten. It is the essence of this embodiment to record and reproduce the first information (ROM information) and second information (RAM information) in an overlap (multiplex) relation in the same area of a disk by utilization of the foregoing properties of the recording medium.

Figure 3A:
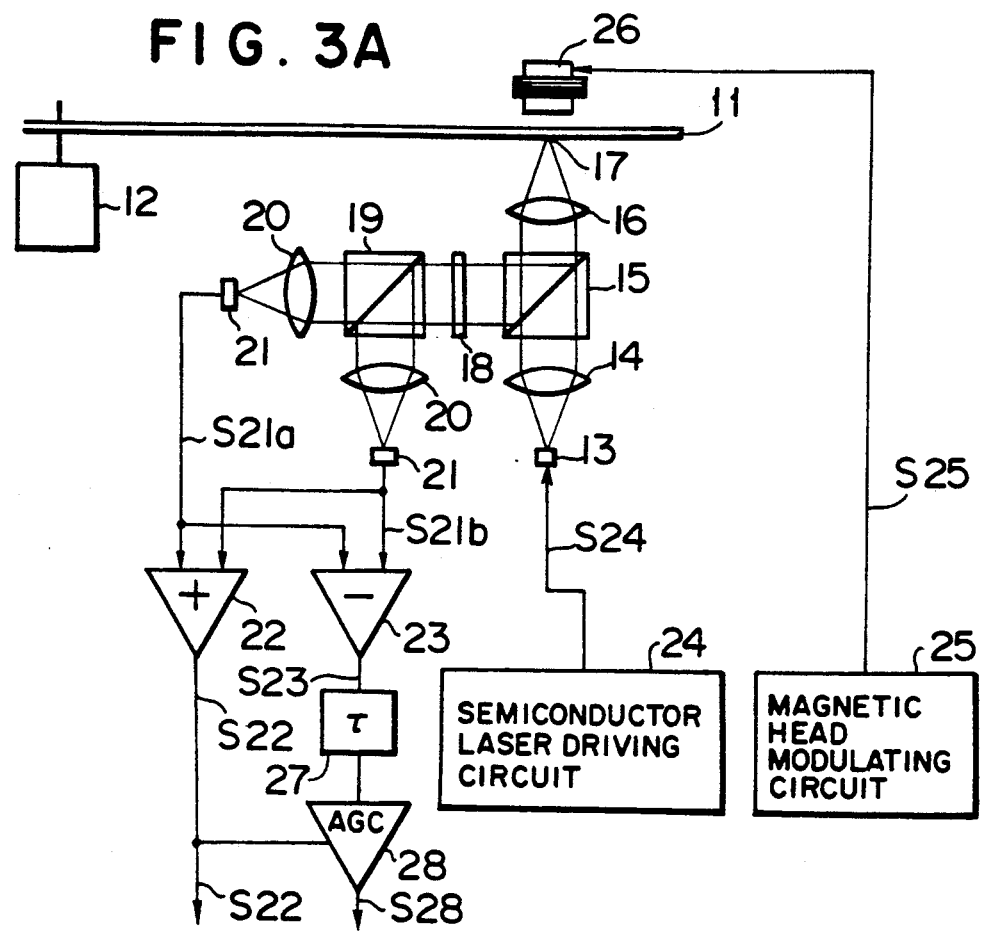
FIG. 3A is a diagram explaining an embodiment of the inventive recording-reproduction apparatus.

FIG. 3A shows a recording and reproducing apparatus as an embodiment of this invention. The apparatus comprises a recording and reproducing system based on magnetic field modulation including a semiconductor laser source 13, lenses 14, 16 and 20, polarizing prisms 15 and 19, a half wavelength plate 18, a photosensor 21, an adding amplifier 22, a differential amplifier 23, a semiconductor laser drive circuit 24, a magnetic head modulation circuit 25, a magnetic head 26, and a motor 12, and the foregoing optical recording disk 11 having overlapped ROM and RAM records.

Figure 3B:
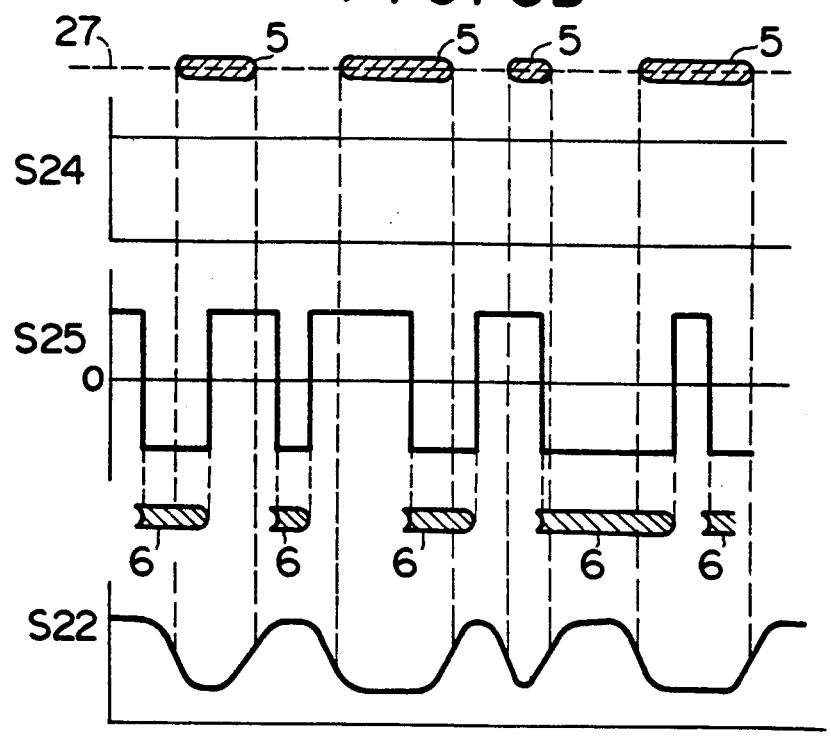
FIG. 3B is a diagram explaining the inventive method for recording the second information (RAM information).

The operation of the apparatus shown in FIG. 3A for recording the second information (RAM data) will be described using the timing chart of FIG. 3B. The disk 11 has, on its one side, a formation of pit strings of a phase structure along concentric or spiral tracks, as shown at the uppermost section of FIG. 3B. A laser beam emitted by the semiconductor laser source 13 (the beam is assumed to be rendered linear polarization in parallel to the plane of drawing) is collimated by the lens 14, conducted through the polarization prism 15, and focused by the lens 16 to form a light spot 17 on the opto-magnetic recording film 4 of the disk 11. In recording the second information (RAM information) carried by a MO signal, the semiconductor laser drive circuit 24 supplies a drive current (d.c. current) S24 to the semiconductor laser source 13 so that the domain of the opto-magnetic recording film irradiated by the light spot is heated to exceed the temperature (Curie temperature) at which the magnetism vanishes, and laser source produces a high-power laser beam. At the same time, the user's second information (RAM information) is modulated by the magnetic head modulation circuit 25 into a current waveform as shown by S25 in FIG. 3B, and it drives the magnetic head 26. The magnetic head 26, when driven by the modulated current S25 having alternating polarities, produces a magnetic field which is perpendicular to the disk surface and alternates the direction in synchromism with the modulation. If the area of the recording film where the magnetic field is applied is sufficiently larger than the light spot 17, the domain which has been heated beyond the Curie temperature by the irradiation of the high-power light spot moves as the disk 11 rotates, and when it cools down below the Curie temperature, it holds the direction of magnetic field applied by the magnetic head 26, resulting in the formation of a opto-magnetic signal domain 6 that reflect the second information, as shown in FIG. 3B. Since the semiconductor laser 13 is rendered a d.c. driving, the first information (ROM information) which is recorded at manufacturing as pit strings 5 of a phase structure on the disk can be detected as the variation in the amount of reflected light S22 from the disk surface. Specifically, the reflected light from the disk 11 has its about 25% part reflected after it goes back through the lens 16, and after being separated into two directions by the half wavelength plate 18 and polarization prism 19, the beams are focused by two lenses 20 and are rendered the opto-electric conversion by two photosensors 21 into electrical signals S21a and S21b. The reproduced signal for the first information (ROM information) is obtained as a sum signal S22 at the output of the summing amplifier 22 which sums the signals S21a and S21b. Consequently, reproduction of the first information (ROM information) and recording of the second information (RAM information) can take place concurrently on one spot.

Figure 3C:
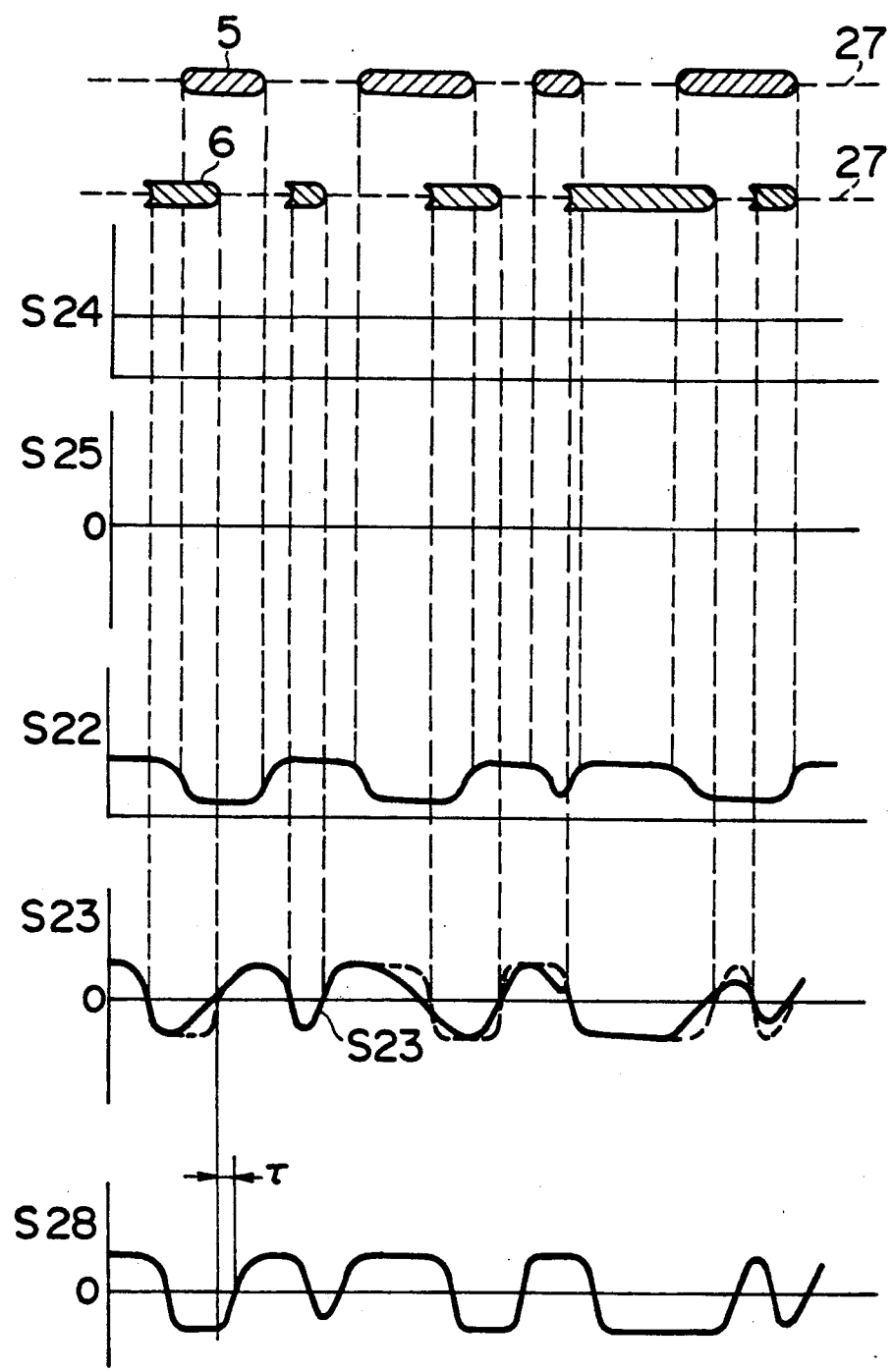
FIG. 3C is a diagram explaining the concurrent reproduction of the first information (ROM information) and second information (RAM information) according to this invention.

Next, concurrent reproduction of the first information (ROM information) and second information (RAM information) will be explained using FIGS. 3A and 3C. Two pit strings shown at the top of FIG. 3C are a opto-magnetic signal domain 6 recorded for the second information (RAM information) and a pit string formed in a phase structure at manufacturing. The pit string 5 and opto-magnetic signal domain 6 overlap each other in the same area. The principle of reproduction for the first information (ROM information) is identical to that shown in FIG. 3B, with a difference being that the laser drive current S24 is smaller than the case of FIG. 3B so that the recording film is not heated to exceed the Curie temperature. The reproduced signal S22 for the first information is derived from the variation of intensity of the reflected light, whereas the second information (RAM information) is retrieved from the rotation of polarization plane of the reflected light. The opto-magnetic signal domain 6 shown by hatching in FIG. 3C and its peripheral region have opposite directions of magnetic field held in the recording film, and when the track 27 is irradiated by the linearly polarized light spot 17 which is reflected on the recording film, the polarization plane rotates slightly due to the Kerr effect. Assuming the light beam emitted by the semiconductor laser source 13 to have its polarization plane parallel to the plane of drawing, the polarization plane of the reflected light from the disk 11 rotates slightly (generally 1° or less) to have a polarization component perpendicular to the plane of drawing. The variation of this S polarization component corresponds to the second information (RAM information). By using a polarization prism 15 having such characteristics that it reflects virtually 100% of a polarization component (S polarization component, i.e., information component) perpendicular to the plane of drawing and reflects about 70% of a parallel component (P polarization component, i.e., non-information component), the S polarization component (information component) guided by the polarization prism 15 toward the half wavelength plate 18 has an increased proportion relative to the case of disk reflection. The polarization plane of the light beam from the polarization prism 15 is rotated by 45° by means of the half wavelength plate 18, and the beam is split into two beams by means of the polarization prism 19 and conducted to the two photosensors 21. By using a polarization prism 19 which reflects about 100% of the S polarization component and transmits about 100% of the P component, both beams have an equal d.c. component in the amount of light, and they have a.c. components corresponding to the second information (RAM information) appearing oppositely in phase on the two photosensors 21. Accordingly, by converting the outputs of the two photosensors 21 into a differential signal by means of the differential amplifier 23, the opto-magnetic signal corresponding to the opto-magnetic signal domain 6 is produced as shown by S23 in FIG. 3C. This is the reproduced signal for the second information (RAM information). Consequently, the reproduced signal S22 for the first information (ROM information) and the reproduced signal S23 for the second information (RAM information) are obtained concurrently.

The signal waveform corresponding accurately to the opto-magnetic signal domain 6 is shown by the dashed line over the signal S23 in FIG. 3C, but the actual output signal S23 of the differential amplifier 23 is subjected to interference, which resembles the amplitude modulation, of the total reflection from the disk, i.e., the signal S22 for the first information (ROM information), resulting in a waveform shown by the solid line. Depending on the modulation mode for the signal, even such a waveform as S23 resulting from the interference similar to the amplitude modulation can be demodulated in some cases. However, in case of high-density recording for the second information (RAM information) over the ROM information record, it is preferable to eliminate the influence of interference of the opto-magnetic signal S23. A delay element 27 and AGC amplifier 28 shown in FIG. 3A are provided for this purpose. The AGC amplifier 28 is a voltage control amplifier which in response to the total light intensity signal S22 has the gain thereof varied. The amplifier has the gain thereof varied in inverse proportion to the voltage of the signal S22. The delay element 27 is used to delay the opto-magnetic signal S23 by a response time δ that is needed for the AGC amplifier 28 to respond in its gain to the control signal S22. By the use of the AGC amplifier 28, the opto-magnetic signal for the second information (RAM information) is rid of the influence of interference by the reproduced signal S22 for the first information (ROM information), whereby a correct reproduced signal corresponding to the opto-magnetic domain 6 is obtained as shown by S28 at the lowest section of FIG. 3C.

FIG. 8A shows an example of the information format on the disk 11 used in this embodiment. The format includes a ROM index area 35, which indicates the contents of the first information recorded in the ROM area, in the inner section of the disk, and the same section on the opto-magnetic recording film is assigned to a RAM index area 36. FIG. 8B explains the concept of the ROM index area 35 and RAM index area 36. Recorded in the ROM index area 35 are names and store addresses of the first information in the ROM area, while recorded in the RAM index area 36 coincident with the ROM index area 36 are names and store addresses of the second information stored by opto-magnetic recording in the RAM area and, in addition, information which relates the second information (RAM information) with the first information (ROM information). The relational information includes a record which reveals, when the second information recorded in the RAM area is related with the record of the first information in the ROM area, "which first information it is related", "how both informations are related", and so on. For example, in FIG. 8B, the name "kanp" of the second information listed on the third row of the RAM index indicates that the RAM information is related with the first information entitled "BAEG" at address 013F in the ROM area.

With the ROM index area 35 and RAM index area 36 being placed in the same position in an overlap relation, the reproducing apparatus making access to the index area can reproduce the first information (ROM information), second information (RAM information), and their relational information concurrently. With the same contents of information being stored in the memory of a higher rank controller, it can be used for the relational control between the first information (ROM information) and second information (RAM information). When such index areas are used, the first information (ROM information) and second information (RAM information) need not be recorded in a coincident section even if both are closely related, whereby the latitude of information format can be enchanced.

FIG. 9 shows another example of index areas. The ROM index area 35 and RAM index area 36 are not coincident for information recording, but these areas are spatially displaced from each other. A section of the opto-magnetic recording film indicated by 35' and a section of the ROM information area indicated by 36' are left blank. The index areas are formatted in the same manner as the case of FIG. 8B. By the separate layout of the two index areas, the contents of the first information (ROM information) and second information (RAM information) and their relation can be read out sequentially with a single reproduced signal demodulation system. The two index areas are preferably placed closely.

In the foregoing first embodiment of this invention, two signals for the first information (ROM information) and second information (RAM information) can be overlap-recorded in the same area C, whereby the information capacity is doubled. This arrangement is particularly suitable for systems equipped with a small disk drive unit. By utilization of concurrent reproduction of the first information (ROM information) and recording of the second information (RAM information) and concurrent reproduction of the first information (ROM information) and second information (RAM information), it becomes possible to have video information of animation pictures recorded in advance as the first information (ROM information) and allow the user to record the sound as the second information (RAM information) on the same disk, while viewing the reproduced first information (ROM information). It is also possible for the user to reproduce the sound as the second information and the video information as the first information concurrently. This embodiment is particularly suitable for applications where the unit of information is relatively long, as in the case of the image and sound, and concurrent recording and reproduction for the ROM and RAM areas are required.

Figure 4:
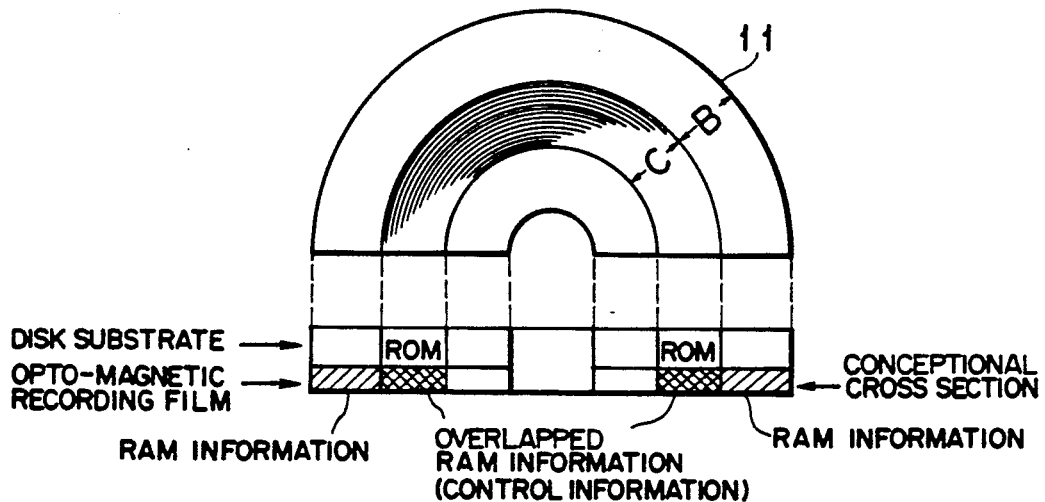
FIG. 4 is a diagram explaining another embodiment of the inventive information recording medium.

Next, a second embodiment of the present invention will be described with reference to FIGS. 4 and 5. Formed on the disk are a RAM area B which is recorded by the user and a ROM area C in which ROM information of a phase structure is recorded at manufacturing, as shown in FIG. 4. An opto-magnetic recording film is deposited by evaporation on the disk substrate. The area B is used as a user write only area, and the area C is used as a ROM/RAM overlap recording area. The provision of the sole-RAM area B besides the ROM/RAM overlap area provides the extensive usage in addition to the usage of the first embodiment. As an example, the area C is to record control information (pointers, etc.) for the first information (ROM information) recorded in the same area as for the second information. In the case of the usage where the user records one's own information over the supplied first information (ROM information), such as a dictionary, the user's information falls into relatively small pieces of information, such as for underlining and marking, and relatively large pieces of information, such as user's comments and examples of sentence. In this embodiment, the former relatively short second information is overlap-recorded as control information on the opto-magnetic recording film in the area C, and the latter relatively long second information is recorded in the RAM area B.

Figure 5:
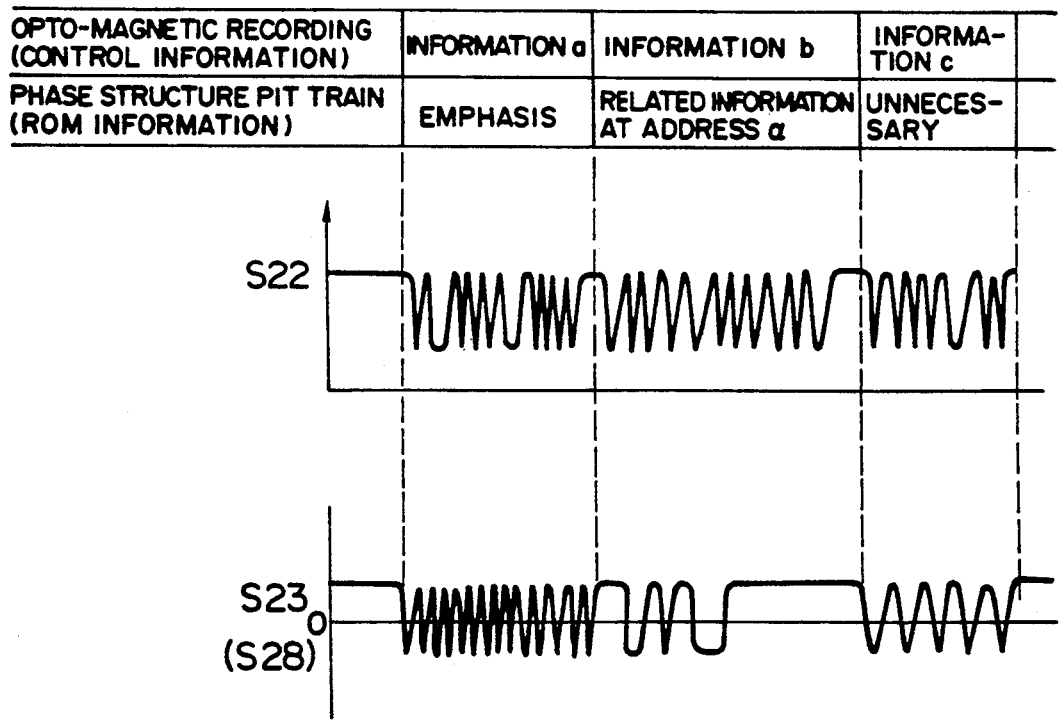
FIG. 5 is a diagram explaining an example of information record on the inventive information recording medium.

FIG. 5 explains the concept of using the opto-magnetic recording film in the ROM/RAM overlap recording area C as a control information area for the first information (ROM information). FIG. 5 shows in the uppermost section the cross-section of the area C in the circumferential direction of the track, shows in the intermediate section the waveform of the reproduced ROM signal S22, and shows in the bottom section the waveform of the RAM signal (opto-magnetic signal) S23 (or S28). The signals S22, S23, S28 and so on correspond to the signals in FIG. 3A. It is assumed that the first information (ROM information) including information a, information b and information c is recorded as pit strings of a phase structure at manufacturing. The example is the optomagnetic overlap recording by the user of information indicative of "emphasized display" in reproducing the information a, information indicative of address α in the RAM area B of the location of information related to the information b in reproducing the information b, and information indicative of "no display" at reproduction for the information c. This overlap recording allows the user to have display control for the ROM information using the contents of RAM information on a real-time basis, while reproducing the ROM information S22 sequentially. It is not required for the overlapped control information to be in strict spatial correspondence to the ROM information, but it may be allocated close to the ROM information depending on the data processing method.

The control information may be placed in part of the sole-RAM area B, instead of being in an overlap relation with the ROM information, for accomplishing the same function. In this case, however, the control information needs to be loaded in advance into the memory of a higher rank controller (personal computer, etc.) and an additional memory capacity is required for reproducing the ROM information in correspondence to the control information. By recording the control information over the corresponding ROM information, as in this embodiment, the memory areas on the disk and in the higher rank controller can be saved.

The control information is generally less in volume than the corresponding first information (ROM information) in most cases, and therefore it can be recorded at a lower recording density than that of the first information (ROM information). On this account, the influence of interference of the ROM signal with the opto-magnetic signal mentioned in the preceding first embodiment can be reduced. As a result, the processing by the AGC amplifier 28 shown in FIG. 3A may be eliminated in demodulation and the reproduction system can be simplified in some cases.

Although in this embodiment a ROM area and a RAM area are formed on the disk and the user can overlap-record control information in the ROM area, however, the present invention is not confined to control information which can be recorded over the record in the ROM area, but arbitrary user's information can also be recorded as in the case of the first embodiment.

Figure 6A:
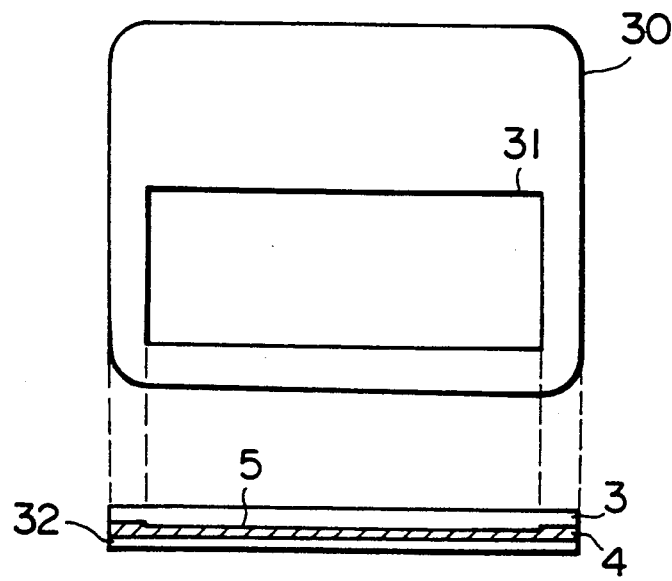
FIGS. 6A, 6B, 7A and 7B are diagrams explaining examples of card as embodiments of the inventive information recording medium.

The foregoing two embodiments are examples of this invention using an optical disk recording medium. However, the present invention is not only applicable to a circular disk medium, but it is also applicable to recording mediums in other shapes. FIG. 6 shows an embodiment of this invention applied to an optical card. Shown in FIG. 6A is the external view of an optical card 30, which is provided with an information area 31 for storing information and reproducing the information in the optical manner. The card is formed of a transparent substrate 3, an opto-magnetic recording film 4 and a protection layer 32 which covers the opto-magnetic film. ROM information is recorded at manufacturing as pit strings of a phase structure in part of the substrate, as in the cases of the first and second embodiments. The substrate can be fabricated by the injection formation method, photo polymerization (2P) method, glass etching method, or the like, as in the case of the disk. The opto-magnetic recording film 4 is used by the user to make opto-magnetic recording of RAM information.

Figure 6B:
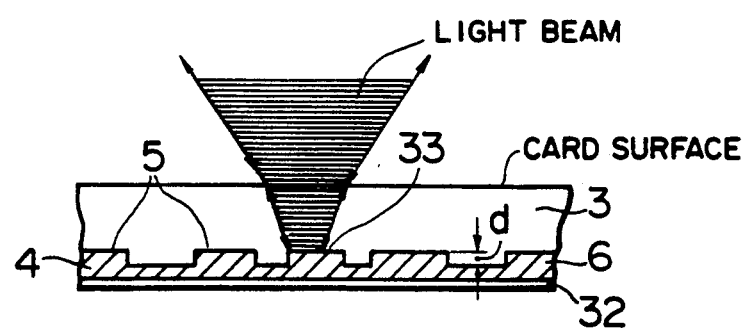
Figure 7A:
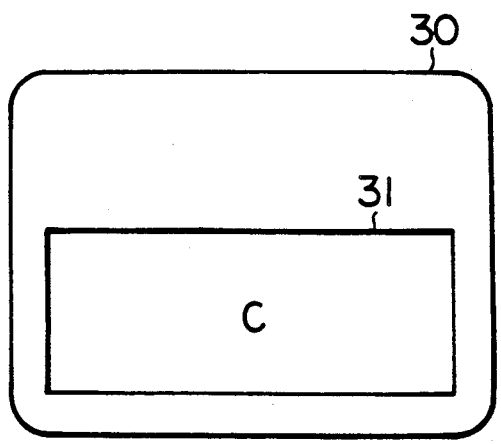
Figure 7B:
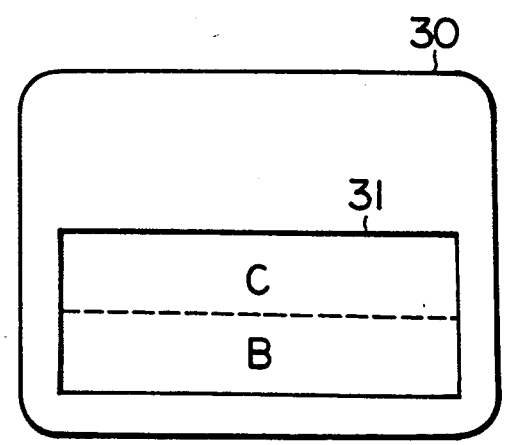

FIG. 6B explains the cross-section of the information area 31. The ROM information is recorded in advance as pit strings 5 of a phase structure in the substrate 3 of the card. The depth d of a pit is preferably equal to a quarter wavelength of the reproducing light from the viewpoint of the signal modulation depth. The record is reproduced by irradiating a converged light beam from the substrate side of the card. The principle and apparatus for implementing the overlap recording and reproduction for the ROM and RAM informations are completely identical to the case of the disk described on FIG. 3. The optical card can choose the direction of information tracks depending on the structure of the recording-reproduction apparatus. In this embodiment, information tracks extend in the horizontal direction in FIG. 6A. FIG. 7A shows an example in which the entire information area 31 is assigned to the ROM/-RAM overlap recording area C, while FIG. 7B is an example in which a sole-RAM area B is provided separately from the ROM/RAM overlap recording area C, the two cases corresponding to FIG. 1 and FIG. 4, respectively, of the case of the disk.

By application of the present invention to the optical card, it becomes possible to record and reproduce user's information over ROM information which is supplied with the card, as in the case of the optical disk. In the case of the optical card, where the access speed and information transfer rate is lower than the disk, frequent accesses to separate ROM and RAM areas can result in a considerable overhead of head movement, whereas according to this embodiment, ROM information and RAM information can be recorded in the same area and can be reproduced concurrently, whereby the overhead of head movement is reduced significantly and the data transfer rate is equivalently doubled for the ROM and RAM as the whole. Moreover, the information area of the optical card, which generally has a lower recording density and smaller volume of information than the optical disk, can virtually be doubled at maximum through the overlap recording of the ROM and RAM informations, and therefore the application of the present invention to the optical card is effective also from the viewpoint of information capacity.

These are the detailed explanation of the principle and embodiments of the present invention. The invention allows the user to have the opto-magnetic recording for user's information (RAM information) over the ROM information area which is recorded as pits of a phase structure, and consequently, (1) the user can have a doubled area at maximum for the ROM and RAM informations as the whole; (2) the user can have an equivalently doubled information transfer rate owing to the concurrent reproduction of the ROM information and RAM information; (3) the user can erase and rewrite the RAM information any number of times without damaging the ROM record; (4) the user can access both the ROM information and RAM information on a single drive unit; and (5) the user can reproduce the ROM information and record the RAM information concurrently. Consequently, the present invention can be a very effective means for promoting an innovative information usage in which the user modifies immense ROM information, which is supplied at a low price, to meet the user's personal use.

We claim:

1. A method for recording and reproducing information on an information recording medium including a transparent substrate having first information prerecorded in the form of pit strings of a phase structure along at least one track on at least one surface of the substrate, and an opto-magnetic recording film formed on the at least one surface of the substrate, the method comprising the steps of:

overlap-recording second information which is related to the first information on the at least one track on the surface of the substrate having the first information recorded thereon by applying a magnetic field having polarities corresponding to the second information to be recorded to the recording film in the presence of a high-power radiation beam emitted onto the information recording medium, the first information being reproduced in accordance with changes of intensity of a reflected light of the high-power radiation beam from the information recording medium simultaneously with the overlap-recording of the second information; and simultaneously reproducing the first information and the second information by applying a low-power radiation beam to a track where the first information and the second information are recorded in an overlapped relation, the first information being reproduced from changes of intensity of a reflected light of the low-power radiation beam from the information recording medium and the second information being reproduced from a rotation of a polarization plane of the reflected light.

2. A method according to claim 1, wherein the first information and the second information have different recording densities or modulation modes.

3. A method according to claim 1, wherein the first information includes a linguistic dictionary, and the second information includes at least one of words, underlines and translated words needed by a user.

4. A method according to claim 1, wherein the first information includes video information, and the second information includes audio information.

5. A method for recording and reproducing information on an information recording medium including a transparent substrate having first information prerecorded in the form of pit strings of a phase structure along at least one track on at least one surface of the substrate, and an opto-magnetic recording film formed on the at least one surface of the substrate, the method comprising the steps of:

overlap-recording second information which is related to the first information on the at least one track on the surface of the substrate having the first information recorded thereon by applying a magnetic field having polarities corresponding to the second information to be recorded to the recording film in the presence of a high-power radiation beam emitted onto the information recording medium, the first information being reproduced in accordance with changes of intensity of a reflected light of the high-power radiation beam from the information recording medium simultaneously with the overlap-recording of the second information; and simultaneously reproducing the first information and the second information by applying a low-power radiation beam to a track where the first information and the second information are recorded in an overlapped relation, the first information being reproduced from changes of intensity of a reflected light of the low-power radiation beam from the information recording medium and the second information being reproduced from a rotation of a polarization plane of the reflected light;

wherein the second information is reproduced by detection of the rotation of the polarization plane utilizing an amplifier having a variable gain which varies in inverse proportion to an amount of reflected light corresponding to the first information.

6. An information recording medium comprising:

a transparent substrate having first information prerecorded in the form of pit strings of a phase structure on at least one track on at least one surface of the substrate; and an opto-magnetic recording film deposited directly on the at least one surface of the substrate, the opto-magnetic recording film being responsive to application of a magnetic field having polarities corresponding to second information to be recorded in the presence of a high-power radiation beam emitted onto the recording medium for enabling recording of the second information in at least partially overlapping relation with the first information on the at least one track;

wherein the first information is pre-recorded on a first part of the substrate, and a second part of the substrate having no first information recorded thereon and provided with the opto-magnetic recording film enables recording of third information related to the first or second information thereon; and wherein the first information is reproduced in accordance with changes of intensity of a reflected light of the high-power radiation beam from the information recording medium simultaneously with the overlap-recording of the second information.

7. An information recording medium according to claim 6, wherein the substrate has a shape of a circular disc.

8. An information recording medium according to claim 6, wherein the substrate has a shape of a card.

9. An information recording medium according to claim 6, wherein a first index area for the first information is formed as a pit string of a phase structure, and a second index area for the second information is formed on the opto-magnetic recording film, the first and second index areas being located so that the first and second index areas at least partially overlap.

10. An information recording medium according to claim 9, wherein a record recorded in the second index area includes information representing the content of the second information recorded by opto-magnetic recording on the opto-magnetic ring film and information representing correspondence between the first information and the second information.

11. An information recording medium according to claim 6, wherein a first index area for the first information is formed as a pit string of a phase structure, and a second index area for the second information is formed on the opto-magnetic recording film, the first and second index area being spaced from one another.

12. An information recording medium according to claim 11, wherein a record recorded in the second index area includes information representing the content of the second information recorded by opto-magnetic recording on the opto-magnetic recording film and information representing the correspondence between the first information and the second information.

13. An information recording medium according to claim 1, wherein the first information includes a linguistic dictionary, and the second information includes at least one of words, underlines and translated words needed by a user.

14. An information recording medium according to claim 6, wherein the first information includes video information, and the second information includes audio information.

15. A method according to claim 6, wherein the second information is information reproduced simultaneously with reproduction of the first information.

16. A method according to claim 6, wherein the second information is control information of the first information.

17. A method according to claim 6, wherein the second information is information indicative of a position on the information recording medium at which information related to the first information is recorded.

18. A recording and reproducing apparatus comprising:

an information recording medium including a transparent substrate having first information pre-recorded in the form of pit strings of a phase structure on at least one track on at least one surface of the substrate, and an opto-magnetic recording film formed on the at least one surface of the substrate, the opto-magnetic recording film being responsive to application thereof of a magnetic field having polarities corresponding to second information to be recorded in the presence of a high-power radiation beam emitted onto the recording medium for enabling overlap-recording of the second information on the at least one track having the first information pre-recorded thereon;

irradiation means for emitting the high-power radiation beam onto the information recording medium during recording of the second information and for emitting a low-power radiation beam onto the information recording medium during an operation other than the recording of the second information;

magnetic field application means for applying the magnetic field having polarities corresponding to the second information during recording of the second information;

first reproduction means for reproducing the first information in accordance with changes of intensity of a reflected light from the information recording medium; and second reproduction means for reproducing the second information from a rotation of a polarization plane of the reflected light from the information recording medium, the second reproduction means including a variable gain amplifier, the gain of the variable gain amplifier being varied in accordance with an amount of a signal from the first reproduction means;

wherein the gain of the variable gain amplifier varies in inverse proportion to the amount of the signal from the first reproduction means corresponding to the first information.

* * * * *